United States Patent Office.

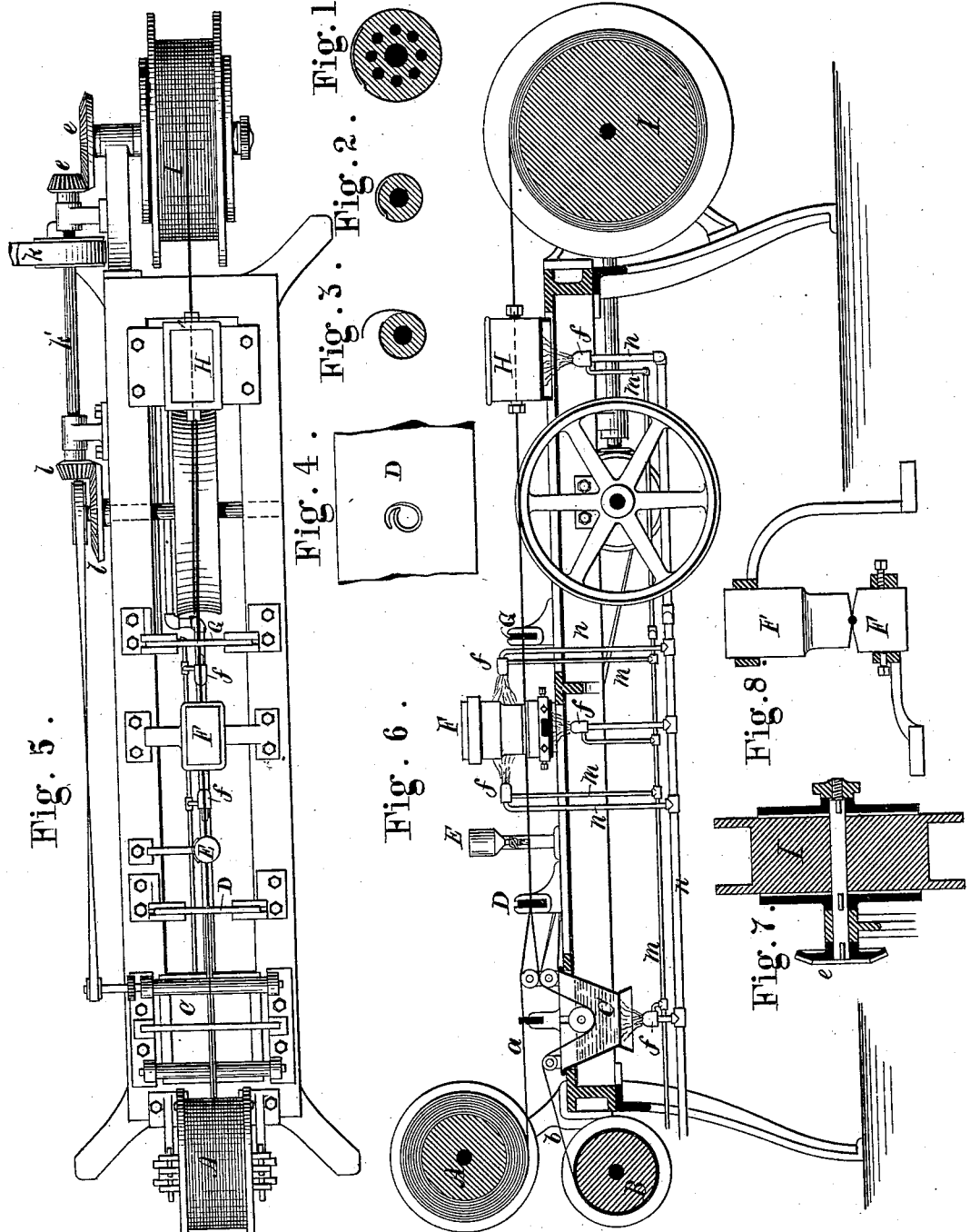

WILLIAM HALKYARD, OF PROVIDENCE, RHODE ISLAND, ASSIGNOR OF ONE-HALF TO HENRY A. CHURCH, OF SAME PLACE.

MACHINE FOR COVERING ELECTRICAL CONDUCTING-WIRES WITH METALLIC ARMOR.

SPECIFICATION forming part of Letters Patent No. 253,529, dated February 14, 1882.

Application filed July 22, 1881. (No model.)

*To all whom it may concern:*

Be it known that I, WILLIAM HALKYARD, of the city and county of Providence, State of Rhode Island, have invented a new and useful Improvement in Machines for Covering Electrical Conducting-Wires with Metallic Armor; and I hereby declare that the following is a full, clear, and exact description of the same, reference being had to the accompanying drawings, forming part of this specification.

The invention consists in the novel combination of devices composing a machine for covering a wire with a longitudinal strip or sheet of metal and securing the lapped edges of the covering-strip, as will be hereinafter particularly described, and pointed out in the claims.

Figure 1 is a sectional view of an insulated cable protected by a sheet-metal armor, in which the edges of the metal overlap and are brazed together. Fig. 2 is a sectional view of an insulated wire covered with a sheet-metal armor consisting of a strip of sheet metal, the edges of which overlap, and which are secured together by solder or brazing. Fig. 3 is a sectional view of an insulated wire, showing the insulating material incased in a sheet-metal strip, one edge of which is raised. Fig. 4 is a view of the die-plate through which the insulated wire and the strip of metal are passed so as to produce the form shown in Fig. 3. Fig. 5 is a top view of the machine in which the wire is covered and rolled on a drum. Fig. 6 is a sectional view of the machine, showing the drum from which the metal strip is delivered, the wire-drum, the course of the wire through the machine, and the receiving-drum. Fig. 7 is an enlarged sectional view of the winding-drum, and Fig. 8 is an enlarged view of the brazing-block.

In the drawings, A is the drum from which the wire is delivered; B, the drum from which the strip of metal is delivered.

$a$ is the insulated wire, and $b$ the covering-strip. This strip is usually a narrow strip of copper, brass, or other suitable metal wide enough to surround the insulated wire and lap over the edges, so that the same may be brazed together. A lead or other soft-metal pipe may be used, which, when slit open, will receive the wire, and when reclosed will have sufficient lap to be soldered or brazed.

C is a vessel in which heated tin or similar metal, or a composition of metals, is kept hot, and through which the sheet or armor is passed, so as to cover the same with tin, suitable rolls being provided to guide its course through the tin bath. From the bath the strip $b$ enters one or more dies D, and the wire $a$ also enters the dies. The strip is here bent around the insulated wire and covers the same closely, as is shown in Fig. 3. One edge, however, is raised sufficiently to allow fluxing material to be placed on the same by the receptacle E. The wire now passes to the soldering or brazing dies F F, one above the other, both being heated preferably by the gas-jets $f\ f$, where the raised edge of the armor is pressed over the other edge of the same strip and firmly united by the heat of the brazing-dies. The covered wire is now passed through the dies G, where it is rounded, as shown in Fig. 2, or, if more than one wire is inserted, as shown in Fig. 1. It may now, by being passed through a bath of molten tin, (indicated at H,) be covered with tin or any other metal or material, to protect it before it is wound on the receiving-drum I, which may be constructed, as shown in Fig. 7, so as to be driven by frictional contact; or it may be made to revolve horizontally, like the ordinary draw-drum in wire-drawing machines. This machine may be operated by means of a belt, $k$, driving the shaft $k'$, and connected by means of the beveled gears $l\ l$ with the various parts; or it may be driven in any other manner. The heat used is preferably produced by burning gas on the principle of the blow-pipe, and for that purpose the gas-supply pipes $m\ m$ and the pipes $n\ n$, supplying air under pressure, are united in the several burners. The wire or cable, when covered with this sheet armor formed of a narrow strip of sheet metal and thoroughly brazed, can be reeled on a reel and paid out as well as any other insulated wire, as it is more flexible than wire would be of a corresponding diameter.

The core-wire may be made lighter when incased in the sheet, lapped, and brazed, as the sheet greatly adds to its strength.

The insulating material may be composed of matter not affected by heat in the process of brazing or soldering, and thus a durable incased insulated wire or cable produced at small cost and rapidly.

The incased wire may be used for telegraphic purposes and is particularly valuable for telephone use, as by means of the inner wire and the metallic armor a metallic circuit can be readily established and induction diminished or entirely prevented.

I do not broadly claim covering insulated wire by a sheet-metal armor, as I am aware that this is not new; but by lapping the sheet longitudinally and brazing or soldering the same great strength is secured, and the insulating material is better protected than in armor as heretofore made.

Having thus described my invention, I claim as new and desire to secure by Letters Patent—

1. In a machine for covering wire or cable, the combination of the following instrumentalities: a die constructed to form the strip of sheet metal around the wire or cable so as to lap over at the edges, a device for soldering or brazing the wire, and a drum or barrel to receive the wire, as described.

2. The combination, with the wire-drum A and sheet-metal strip $b$, of the tinning-vessel C, the die D, the flux-supply E, the soldering-block F, the die G, and means for drawing the wire through the machine and guiding the same so as to cover the wire by a sheet of metal which is lapped and soldered longitudinally, as described.

WILLIAM HALKYARD.

Witnesses:
HENRY J. MILLER,
J. A. MILLER, JR.